(12) United States Patent
Cheng et al.

(10) Patent No.: US 10,928,701 B2
(45) Date of Patent: Feb. 23, 2021

(54) LARGE ANGLE IMAGE STEERING DEVICE (71) Applicants: KENT STATE UNIVERSITY, Kent, OH (US); INTEL CORPORATION, Santa Clara, CA (US)

(72) Inventors: Hsien-Hui Cheng, San Jose, CA (US); Philip Bos, Hudson, OH (US); Achintya Bhowmik, Cupertino, CA (US)

(73) Assignee: Kent State University, Kent, OH (US)

( * ) Notice: Subject to any disclaimer, the term of this patent is extended or adjusted under 35 U.S.C. 154(b) by 325 days.

(21) Appl. No.: 16/077,762

(22) PCT Filed: Feb. 22, 2017

(86) PCT No.: PCT/US2017/018807
§ 371 (c)(1),
(2) Date: Aug. 14, 2018

(87) PCT Pub. No.: WO2017/147112
PCT Pub. Date: Aug. 31, 2017

(65) Prior Publication Data
US 2019/0056636 A1 Feb. 21, 2019

Related U.S. Application Data
(60) Provisional application No. 62/299,051, filed on Feb. 24, 2016.

(51) Int. Cl.
*G02F 1/31* (2006.01)
*G02F 1/03* (2006.01)
(Continued)

(52) U.S. Cl.
CPC ............ *G02F 1/31* (2013.01); *G02B 26/08* (2013.01); *G02B 27/28* (2013.01); *G02F 1/0136* (2013.01);
(Continued)

(58) Field of Classification Search
CPC . G02F 1/31; G02F 1/0136; G02F 1/03; G02F 1/29; G02F 2203/07; G02F 2203/24; G02B 26/08; G02B 27/28
See application file for complete search history.

(56) References Cited

U.S. PATENT DOCUMENTS

| | | | |
|---|---|---|---|
| 2004/0174477 A1* | 9/2004 | Okamoto | G02F 1/1396 349/113 |
| 2006/0126183 A1* | 6/2006 | Hasman | G02B 5/1809 359/573 |

(Continued)

OTHER PUBLICATIONS

International Search Report dated Jul. 16, 2017 for International application No. PCT/US2017/018807.

(Continued)

*Primary Examiner* — Nathanael R Briggs
(74) *Attorney, Agent, or Firm* — Fay Sharpe LLP (57) ABSTRACT

An optical beam deflection device includes a dual-twist Pancharatnam phase device (DTPPD) with first and second Pancharatnam layers each with an in-plane twist and a transverse twist that is at least 60° over the thickness of each Pancharatnam layer, and more preferably at least 75°, and still more preferably at least 90°, with the twist sense of the second Pancharatnam layer being opposite the twist sense of the first Pancharatnam layer. To provide switchable beam deflection, an electro-optic polarization element inputs a circularly polarized light beam to the DTPPD with left-handed circular polarization or right-handed circular polarization controlled by an electrical input.

21 Claims, 8 Drawing Sheets

(51) Int. Cl.
  *G02B 27/28* (2006.01)
  *G02B 26/08* (2006.01)
  *G02F 1/01* (2006.01)
  *G02F 1/29* (2006.01)

(52) U.S. Cl.
  CPC ............... *G02F 1/03* (2013.01); *G02F 1/29* (2013.01); *G02F 2203/07* (2013.01); *G02F 2203/24* (2013.01)

(56) References Cited

U.S. PATENT DOCUMENTS

| | | |
|---|---|---|
| 2008/0297898 A1 | 12/2008 | Martin |
| 2009/0257106 A1 | 10/2009 | Tan et al. |
| 2012/0099413 A1 | 4/2012 | Sharp |
| 2012/0206667 A1* | 8/2012 | Kroll .................... H04N 13/302 349/15 |
| 2014/0285893 A1* | 9/2014 | Tabirian ............. G02B 27/4272 359/573 |
| 2016/0011353 A1* | 1/2016 | Escuti .................. G02B 5/3083 359/15 |

OTHER PUBLICATIONS

Written Opinion of the International Searching Authority dated Jul. 16, 2017 for International application No. PCT/US2017/018807.

Cheng, Hsein Hui et al., *Concept for a transmissive, large angle, light steering device with high efficiency*, Optics Letters, vol. 40, No. 9, pp. 2080-2083, May 1, 2015.

Oh, Chulwoo et al., *Achromatic diffraction from polarization gratings with high efficiency*, Optics Letters, vol. 33, No. 20, pp. 2287-2289, Oct. 15, 2008.

International Preliminary Report on Patentability dated Aug. 28, 2018 for International Application No. PCT/US2017/018807.

\* cited by examiner

LARGE ANGLE IMAGE STEERING DEVICE

This application is a national stage entry under 35 U.S.C. § 371 of International Application Number PCT/US2017/018807 which claims the benefit of U.S. Provisional Application No. 62/299,051 filed Feb. 24, 2016 and titled "LARGE ANGLE IMAGE STEERING DEVICE". U.S. Provisional Application No. 62/299,051 filed Feb. 24, 2016 is hereby incorporated by reference in its entirety into the specification of this application.

BACKGROUND

The following relates to the optical device arts, optical beam deflection or steering arts, and related arts.

Broadband large angle beam steering is an optical operation suitable for application in a wide range of optical tasks, such as non-mechanical tracking cameras and other imaging systems. However, achieving broadband large angle beam deflection with high efficiency using a light-transmissive device is a difficult challenge. For small angles, a prism is a straightforward solution and has high efficiency, but is generally limited to angles no larger than about 45°, above which the deflection angle is greater than the prism angle so that this solution does not work. Optical phased arrays having sawtooth phase profiles can provide high efficiency for small angle deflection, but efficiency decreases rapidly for deflection angles larger than about 15°. Volume holograms designed as Bragg gratings can provide large angle beam deflection, however the angle of incidence and wavelength is restricted by the Bragg condition.

Oh and Escuti, Optics Letters vol. 33, no. 20 pages 2287-89 (2008) ("Oh & Escuti") disclose achromatic beam deflectors employing an achromatic polarization grating with two constituent anti-symmetric chiral circular polarization gratings having opposite twist sense. It was shown in Oh & Escuti that the achromatic polarization grating provides broadband operation ("achromatic diffraction" according to Escuti) for devices providing a deflection angle of around ±15°. The efficiency of these devices has been analyzed in the literature using a diffraction grating model (see Oh and Escuti, Phys Rev A vol. 76 no. 4 (2007)), by which the devices operating in the visible spectrum have been predicted to exhibit deflection efficiency close to 100% only for angles less than about 15°. The efficiency decrease above this deflection angle is inherent in the diffraction grating model, and is attributable to the diffraction grating period approaching the wavelength of the diffracted light. In particular, the efficiency was analyzed in terms of the p parameter:

$$\rho = 2\lambda^2 / \bar{n} \Delta n \Lambda^2 \quad (1)$$

where $\lambda$ is the wavelength of light, $\bar{n}$ is the average index of refraction, $\Delta n$ is the birefringence of the material, and $\Lambda$ is the distance across the aperture where the optic axis rotates 180° (the half-pitch). It is predicted from the theory of diffraction gratings that the efficiency of the grating will only be high if $\rho < 1$. For the case of $\rho < 1$, if it is assumed that $\Delta n$ is a typical value of 0.1 and $\bar{n}$ is 1.55, the above equation predicts $\Lambda$ must be greater than 3.5$\lambda$. From the diffraction angle formula: $\sin \theta = \lambda/\Lambda$, the maximum angle for high efficiency is about 15°. Even if very high values of birefringence are used, such as 0.3, the maximum angle is predicted to be about 30°. Based on this analysis is appears that there is no pathway to achieve deflection angles as large as 60°.

BRIEF SUMMARY

In some illustrative embodiments disclosed herein, an optical beam deflection device comprises a dual-twist Pancharatnam phase device (DTPPD) including a first Pancharatnam layer and a second Pancharatnam layer arranged parallel with the first Pancharatnam layer. The DTPPD has an in-plane twist of pitch effective to deflect an input circularly polarized light beam through a first order deflection angle of magnitude at least 40 degrees. The first Pancharatnam layer has a transverse twist of at least 60 degrees over the thickness of the first Pancharatnam layer along an optical axis of the DTPPD oriented transverse to the first and second Pancharatnam layers. The second Pancharatnam layer has a transverse twist of at least 60 degrees over the thickness of the second Pancharatnam layer along the optical axis with twist sense opposite of the twist sense of the transverse twist of the first Pancharatnam layer.

In some illustrative embodiments disclosed herein, an optical beam deflection device comprises: a dual-twist Pancharatnam phase device (DTPPD) including first and second Pancharatnam layers each with an in plane twist and a transverse twist that is at least 75 degrees over the thickness of each Pancharatnam layer with the twist sense of the second Pancharatnam layer being opposite the twist sense of the first Pancharatnam layer; and an electro-optic polarization element arranged to input a circularly polarized light beam to the DTPPD with left handed circular polarization or right handed circular polarization controlled by an electrical input.

In some illustrative embodiments disclosed herein, an optical beam deflection method comprises: generating circularly polarized light; and deflecting the circularly polarized light by a deflection angle magnitude of at least 40 degrees using a dual-twist Pancharatnam phase device (DTPPD) with intrinsic efficiency $\eta^i$ of at least 0.90. The optical beam deflection method may further comprise reversing handedness of the circularly polarized light whereby the direction of the deflecting is reversed.

DETAILED DESCRIPTION

Disclosed herein are switchable non-mechanical large angle broadband beam steering devices constructed using a dual-twist Pancharatnam phase device (DTPPD) with large transverse twist. As disclosed herein, such a beam steering device can operate with efficiency close to 100% for large deflection angles, e.g. switchable between positive and negative 60-80° in illustrative simulation examples, by using a DTPPD with large transverse twist angles.

This result is surprising because, as described in the background, previous efficiency analysis of achromatic polarization grating devices employing a diffraction grating model has predicted substantial efficiency loss at larger deflection angles as the diffraction period approaches the operating wavelength. By contrast, it is recognized herein that the achromatic polarization grating is actually a variant of the Pancharatnam phase device, namely a dual-twist Pancharatnam phase device (DTPPD). A Pancharatnam phase device is a thin film (thickness in practical devices can be 5 µm or thinner) whose phase profile is continuous and hence independent of the aperture size. Thus, while the director configuration of the achromatic polarization grating or DTPPD is periodic across the aperture of the device (suggesting a diffraction grating model), the phase change of the diffracted light actually changes continuously, not periodically, so that it is recognized herein that a diffraction grating model is not appropriate. Efficiency at high deflection angle is not intrinsically limited for a DTPPD in the same way that a conventional diffractive device is limited.

In an improved model capturing the continuous phase profile of a Pancharatnam phase device, the phase of light in the DTPPD is analyzed, taking into account that the deflected light laterally translates as it propagates through the continuous phase profile of the Pancharatnam phase layer. When the direction of the deflected light causes optical twist due to lateral beam deflection to be canceled by optical twist caused by the transverse twist along the layer thickness, the efficiency of the device is very high. Conversely, when the optical twist due to lateral beam deflection adds to the optical twist caused by the transverse twist along the layer thickness, the efficiency is about zero. So for positive deflectors with such a configuration the first Pancharatnam layer of the DTPPD has very low efficiency while the second Pancharatnam layer provides high efficiency. For negative deflectors the roles of the first and second layers are reversed. The impact of this effect can be enhanced for large deflection angles by employing high transverse twist angle along the optical axis, so as to achieve high efficiency at large deflection angle.

In view of this, a DTPPD with high efficiency at large deflection angle can be designed as follows. When the DTPPD operates as a negative deflector, the optimized structure of DTPPDs make polarization of output light at the first (or input-side) Pancharatnam layer the same to input light's polarization state. In this case, most of light is not diffracted. Then, the structure of the DTPPD makes the polarization state of output light at second (or output-side) Pancharatnam layer opposite to the polarization state of the input light, so that most of the light is diffracted in the second Pancharatnam layer. Conversely, when the DTPPD works as a positive deflector, this same optimized structure makes the polarization state of output light at first (or input-side) Pancharatnam layer almost opposite to the polarization state of the input light, so that most of light already is diffracted to desired direction when light exits the first Pancharatnam layer. The second Pancharatnam layer does not change polarization state of light, so most of light remains at the diffracted direction. (Note that the "positive" and "negative" deflection designations depend upon the arbitrary choice of which deflection direction is deemed "positive" or "negative"). The overall DTPPD optimized in accordance with the above principles receives circularly polarized input light, and outputs circularly polarized deflected light with opposite handedness to the circularly polarized input light.

In sum, the design approach for a high angle deflector is to optimize the transverse twist angle along the optical axis and the phase retardation of two layer device so that one Pancharatnam layer does not strongly affect the input circular polarization state of light while the other Pancharatnam layer changes the polarization state to be of the opposite handedness. Operation is reversed to achieve deflection in the opposite direction when the handedness of the input circular polarization state is reversed. To achieve such a design in the case of a large deflection angle (e.g. 40° or larger), the transverse twist angle of the DTPPD along the optical axis is made large, e.g. transverse twist angle magnitude 75° or higher for each layer of the DTPPD in some embodiments, and transverse twist angle magnitude of 90° or larger for each layer in illustrative embodiments for operation at ±60-80° deflection. Fine tuning of the design to maximize efficiency for a particular material birefringence and design-basis deflection angle is suitably performed by finite-difference time-domain (FDTD) simulations as disclosed herein.

The beam steering devices disclosed herein can be optically switched by switching the handedness of circularly polarized light. Advantageously, numerous optical configurations are known for producing circularly polarized light and for high-speed switching of the handedness of circularly polarized light—thus, the disclosed beam steering systems provide low cost, high-speed-switching between two deflection angles. As a further benefit, the Pancharatnam layers making up the DTPPD can be constructed as a single thin film or two stacked thin films on the order of 1.5 micron thickness, and can be stacked with other planar optical components (e.g. lenses, filters, polarizers, phase retarders) to construct a compact electrically switchable beam deflector system in a low-profile (i.e. thin) package suitable for installation in confined spaces such as in the bezel of a flat-screen LCD or plasma display or the like.

Figure 1:
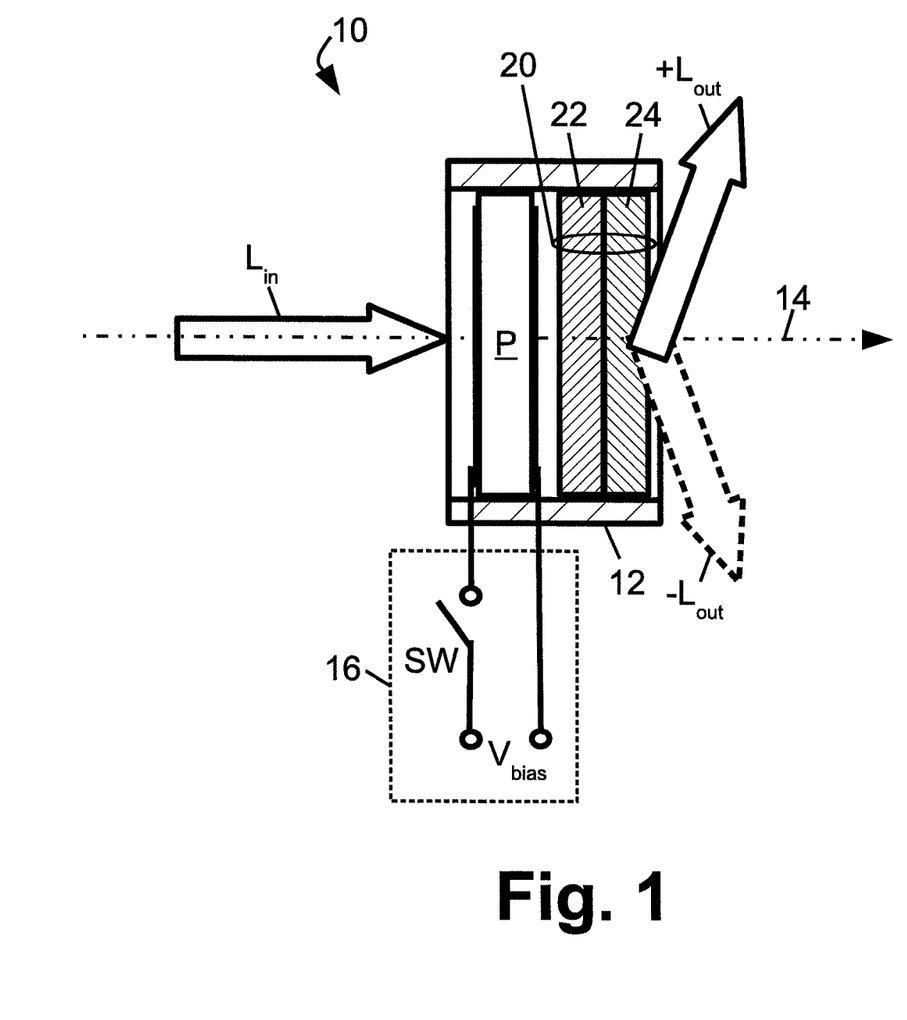
FIG. 1 diagrammatically shows a side sectional view of a beam steering device employing a dual-twist Pancharatnam phase device (DTPPD) providing electrically switchable large angle broadband beam steering.

With reference to FIG. 1, in an illustrative embodiment a non-mechanical electrically switchable beam steering device 10 is housed in a tubular housing 12 (shown in side sectional view) defining a cylinder axis 14 which also is the optical axis 14 of the beam steering device 10. The illustrative tubular housing 12 is assumed to have a circular cross-section, but other cross-sectional shapes are contemplated (e.g. a square, hexagonal, or other cross-section). Input light ($L_{in}$) enters the tubular housing 12 of the illustrative beam steering device 10 from the left, and output deflected light in a positive deflection direction (+$L_{out}$) or in a negative deflection direction (−$L_{out}$) exits the tubular housing 12 of the beam steering device 10 at the right. The input light ($L_{in}$) is polarized by an electro-optic polarization element P, which may take various configurations. In general, the input light ($L_{in}$) processed by the electro-optic polarization element P produces polarized light that is circularly polarized, and whose handedness of circular polarization can be switched between left handedness and right handedness by operation of a switching electrical bias source 16. In the illustrative bias configuration 16, an electrical bias voltage ($V_{bias}$) is selectively applied to the electro-optic polarization element P by way of a switch SW, but other electrically switchable biasing arrangements are suitable. The electro-optic polarization element P can have various configurations (details not shown). In one configuration, the input light ($L_{in}$) is unpolarized and the polarization element P comprises a linear polarizer and a switchable phase retarder that switchable between a −π/2 phase retardation and a +π/2 phase retardation by action of the switchable electrical biasing arrangement 16. In another configuration, the input light ($L_{in}$) is already circularly polarized and the polarization element P includes an electrically switchable 0–π phase retarder. These are merely illustrative examples.

With continuing reference to FIG. 1, the beam steering device 10 further includes a dual-twist Pancharatnam phase device (DTPPD) 20 including a first (or input-side) Pancharatnam layer 22 and a second (or output-side)

Pancharatnam layer 24. The Pancharatnam layers 22, 24 may be manufactured in various ways, and may be fabricated as two distinct Pancharatnam layers 22, 24 that are stacked together to construct the DTPPD 20, or may be fabricated as a single Pancharatnam layer whose transverse twist along the optical axis 14 is reversed at the boundary between the two Pancharatnam layers 22, 24. In an illustrative approach, the Pancharatnam layers 22, 24 are suitably fabricated using a polarization holography alignment technique. See, e.g. Escuti, et al., "Simplified spectropolarimetry using reactive mesogen polarization gratings," Proc. SPIE. vol. 6302, page 630207, (2006); Escuti, and W. M. Jones, "Polarization independent switching with high contrast from a liquid crystal polarization grating," SID Sym. Dig. Tech. Papers 37, 1443-1446 (2006); Escuti et al., "Polarization independent switching with high contrast from a liquid crystal polarization grating," SID Sym. Dig. Tech. Papers vol. 37, pages 1443-1446 (2006); Crawford, et al., "Liquid-crystal diffraction gratings using polarization holography alignment techniques," J. Appl. Phys. vol. 98, page 123102 (2005). In one specific approach, an alignment layer is patterned using a holographic exposure, followed by spin-on deposition of a liquid crystal material followed by polymerization in order to generate the Pancharatnam phase pattern. It should be noted that the Pancharatnam phase layer may be described as a "liquid crystal" or "LC" layer both herein and in the literature generally; however, these terms are borrowed from conventional LC terminology which includes the useful concept of a LC director, and do not necessarily denote a liquid material phase—indeed, the polymerized Pancharatnam phase layers 22, 24 are preferably solid or semi-solid layers, or a single solid or semi-solid layer with the interface between the two optical Pancharatnam layers 22, 24 defined during the spin-on deposition process.

Figure 2:
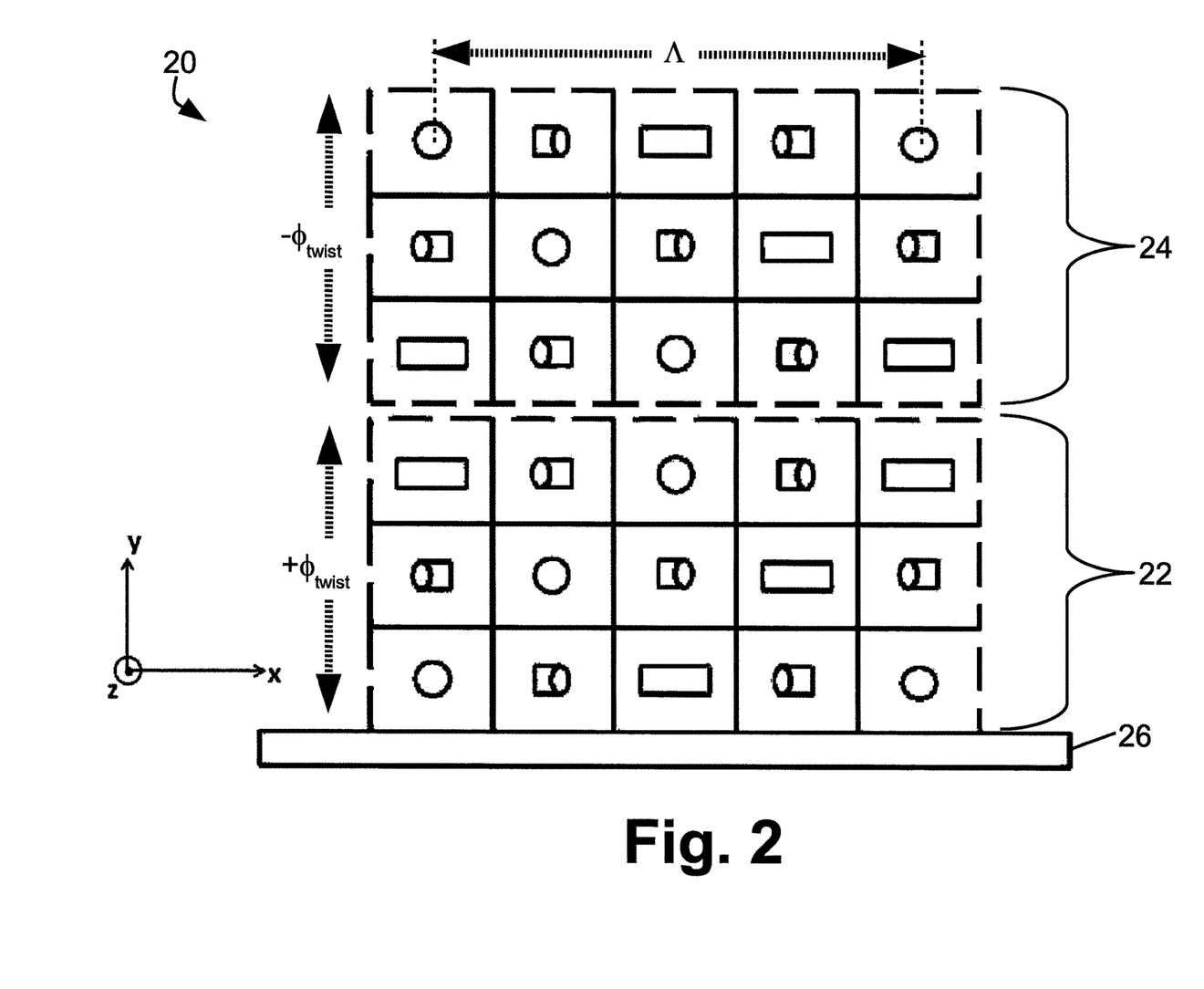
FIG. 2 diagrammatically shows a side sectional view of the DTPPD of the beam steering device of FIG. 1.

With continuing reference to FIG. 1 and with further reference to FIG. 2, an illustrative embodiment of the DTPPD 20 is shown, in which both Pancharatnam phase layers 22, 24 are deposited as a single physical layer on a substrate 26. The illustrative substrate is proximate to the input Pancharatnam layer 22, so that the input Pancharatnam layer 22 is deposited onto the substrate 26 first and the output Pancharatnam layer 24 is then deposited atop the input Pancharatnam layer 22; but alternatively the substrate could be proximate to the output Pancharatnam layer 24 so that layer is deposited first. It is also contemplated to remove the deposition substrate 26 if the Pancharatnam layers 22, 24 are sufficiently rigid to be free-standing, or in another embodiment the Pancharatnam layers 22, 24 are transferred from the original deposition substrate to a separate host substrate using a suitable stack transfer technique.

Advantageously, the first and second Pancharatnam layers 22, 24 can be constructed as a single thin film or as two stacked thin films. In either construction, the first and second Pancharatnam layers 22, 24 can be constructed with a total thickness of two microns or less, so that the DTPPD 20 can achieve large beam deflections of 40° or larger using a very thin operative optical film 22, 24 of thickness two microns or less.

With continuing reference to FIG. 2, an x-y-z Cartesian coordinate system is also shown. Without loss of generality, the y-direction is arbitrarily designated as the optical axis 14, and the x-direction is arbitrarily designated as the "in-plane" direction, that is the direction in the plane of the substrate 26 along which each Pancharatnam phase layer 22, 24 has an in-plane twist with pitch 2Λ (note that the half-pitch Λ is labeled in FIG. 2). The z-direction is then an in-plane direction transverse to the direction of the in-plane twist direction. Each Pancharatnam phase layer 22, 24 also has a transverse twist along the direction normal to the plane of the substrate which is of magnitude $|\phi_{twist}|$. This transverse twist of magnitude $|\phi_{twist}|$ (over the thickness of the layer) is along the optical axis (i.e. y-direction) which is normal to the substrate 26. This transverse twist is of opposite handedness for the two respective Pancharatnam phase layers 22, 24, i.e. the first (input-side) Pancharatnam phase layer 22 has transverse twist $+\phi_{twist}$ over its thickness, and the second (output-side) Pancharatnam phase layer 24 has transverse twist $-\phi_{twist}$ over its thickness. The illustrative transverse twists have magnitude $|\phi_{twist}|=90°$, but this is merely an illustrative example and the transverse twist magnitude $|\phi_{twist}|$ is preferably chosen to maximize deflection efficiency, that is, to maximize intensity of deflected light and to minimize intensity of light that is not deflected.

As shown herein, the DTPPD 20 can be designed to allow for large deflection angles of incident light with high efficiency that is close to 100%. The efficiency for large angle deflection can be much higher than that predicted conventionally using a diffraction grating model, and is not intrinsically limited by the period of the device structure being comparable to the wavelength of light as is the case for conventional diffractive devices.

Using finite difference time-domain (FDTD) modeling, it is shown that the DTPPD 20 can have intrinsic efficiency of about 99% for deflection angles up to 60°. For a single Pancharatnam phase layer (e.g., Pancharatnam phase layer 22 alone, or Pancharatnam phase layer 24 alone) that is illuminated by light of a polarization state given by:

$$\begin{bmatrix} E_{z\text{-}in} \\ E_{x\text{-}in} \end{bmatrix} = \begin{bmatrix} 1 \\ \pm i \end{bmatrix} \qquad (1)$$

the output state of light is given by:

$$\begin{bmatrix} E_{z\text{-}out} \\ E_{x\text{-}out} \end{bmatrix} = \cos\frac{\Gamma}{2}\begin{bmatrix} 1 \\ \pm i \end{bmatrix} - i\sin\frac{\Gamma}{2}e^{-i(\mp 2\varphi)}\begin{bmatrix} 1 \\ \mp i \end{bmatrix} \qquad (2)$$

where $\Gamma=2\pi(\Delta n)d/\lambda$ with $\lambda$ being the wavelength of light, $\Delta n$ being the birefringence of the material, and $d$ being the thickness of the two Pancharatnam layers 22, 24 (each being of thickness d). In the Pancharatnam phase layer, the angle 100 is a function of lateral (i.e. in-plane) position due to the in-plane twist, that is $\varphi \rightarrow \varphi(x)$. Assuming $\varphi(x)$ is a linear function of x, the deflection angle is determined by a $\sin(\lambda/2\Lambda)$ where $\varphi(x)=180° (x/\Lambda)$ and again Λ is the half-pitch of the in-plane twist of the Pancharatnam phase layer.

Figure 3:
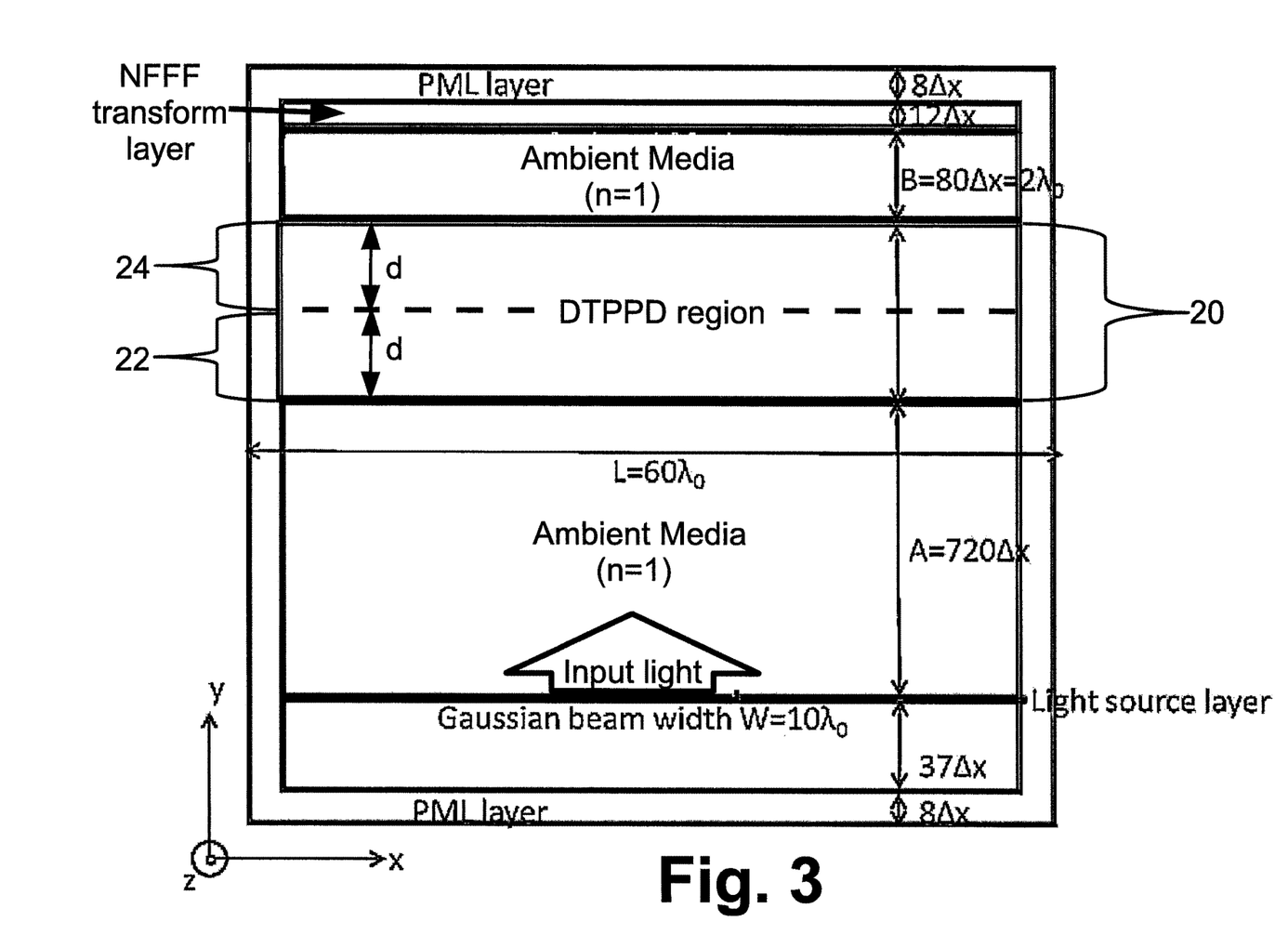
FIG. 3 shows a model of a DTPPD used for efficiency simulations reported herein.

With reference to FIG. 3, the finite difference time-domain (FDTD) model employed for simulating performance of the DTPPD 20 is shown. A perfectly matched layer (PML) was used as a boundary around four sides of the FDTD simulation. The wavelength in vacuum was $\lambda_0=633$ nm (corresponding to the red HeNe laser line) for the simulations. The total width of simulation region was $L=60\lambda_0$ and the full width W of the modeled Gaussian input light beam was $10\lambda_0$. The grid size (or resolution) $\Delta x$ of the FDTD simulation was $\lambda_0/40$, and the time step $\Delta t$ was $\Delta x/(2c_0)$ where $c_0$ is the speed of light in vacuum. No anti-reflection (AR) coating was included on the input and output interferences of the DTPPD 20, but use of such AR coatings is contemplated. As seen in FIG. 3, the near field was collected in the model along a layer located a distance $B=2\lambda_0$ above the top surface of the DTPPD 20. This field was used to perform the near field-to-far field (NFFF) transformation. For each component of the near field, the following equation was used to obtain the corresponding component of far field:

$$E_{far}(x', D) = -\frac{e^{-i\pi/4}}{\sqrt{8\pi k}} \int_{-d}^{d} \frac{e^{ikR_\|}}{\sqrt{R_\|}} \left\{ \frac{\partial E_{near}(x)}{\partial y} + \frac{iky}{R_\|} E_{near}(x) \right\} dx \quad (3)$$

where x' is the horizontal position on the far field screen, x is the horizontal position at the near field to far field (NFFF) transformation layer and far field screen, k is the wave number, and $R_\|$ is the distance between one point on the far field screen and one point at the NFFF transformation layer. For the simulations, the angle of incidence of the input light is assumed to be normal) (0°), and the source layer to computation grid region $A=720\Delta x$.

To quantify the performance of the FDTD-simulated DTPPD 20, the intrinsic diffraction efficiency $\eta_{mth}^i$ for the m-th diffraction order was used, which is given by:

$$\eta_{mth}^i = \frac{I_{mth}}{I_{total\,diff}} \text{ where } I_{total\,diff} = \sum_m I_{mth} \quad (4)$$

where $I_{mth}$ is light intensity of the transverse magnetic (TM) mode at the m-th diffraction order and $I_{total\,diff}$ is the total diffraction intensity of the TM mode. The intrinsic efficiency $\eta_{mth}^i$ is used to compare light intensity at different diffraction orders, not taking into account back-reflections.

FDTD simulations reported here simulate intrinsic diffraction efficiency of the DTPPD 20 with different pitches (2Λ) and birefringence values (Δn) for normally incident light. Each simulation was set up to match the half waveplate condition. The input light was left circularly polarized (LCP) light and director distribution of the DTPPD 20 was right handedness (RH), so the desired diffraction light is at −1st order, e.g. quantified by intrinsic efficiency for the −1$^{st}$ order $$\eta_{-1}^i = \frac{I_{-1}}{I_{total\,diff}}.$$

Given the device symmetry, the simulation could instead be performed for the +1$^{st}$ order with suitable choice of input light handedness, so as to be quantified by intrinsic efficiency for the +1$^{st}$ order $$\eta_{+1}^i = \frac{I_{+1}}{I_{total\,diff}}.$$

To generalize, the intrinsic efficiency $\eta^i$ is used where it is understood that the first order deflection (|m|=1) is intended and the sign (±1) is chosen appropriately for the chosen handedness of input light and of the transverse twists of the layers of the DTPPD.

Figure 4:
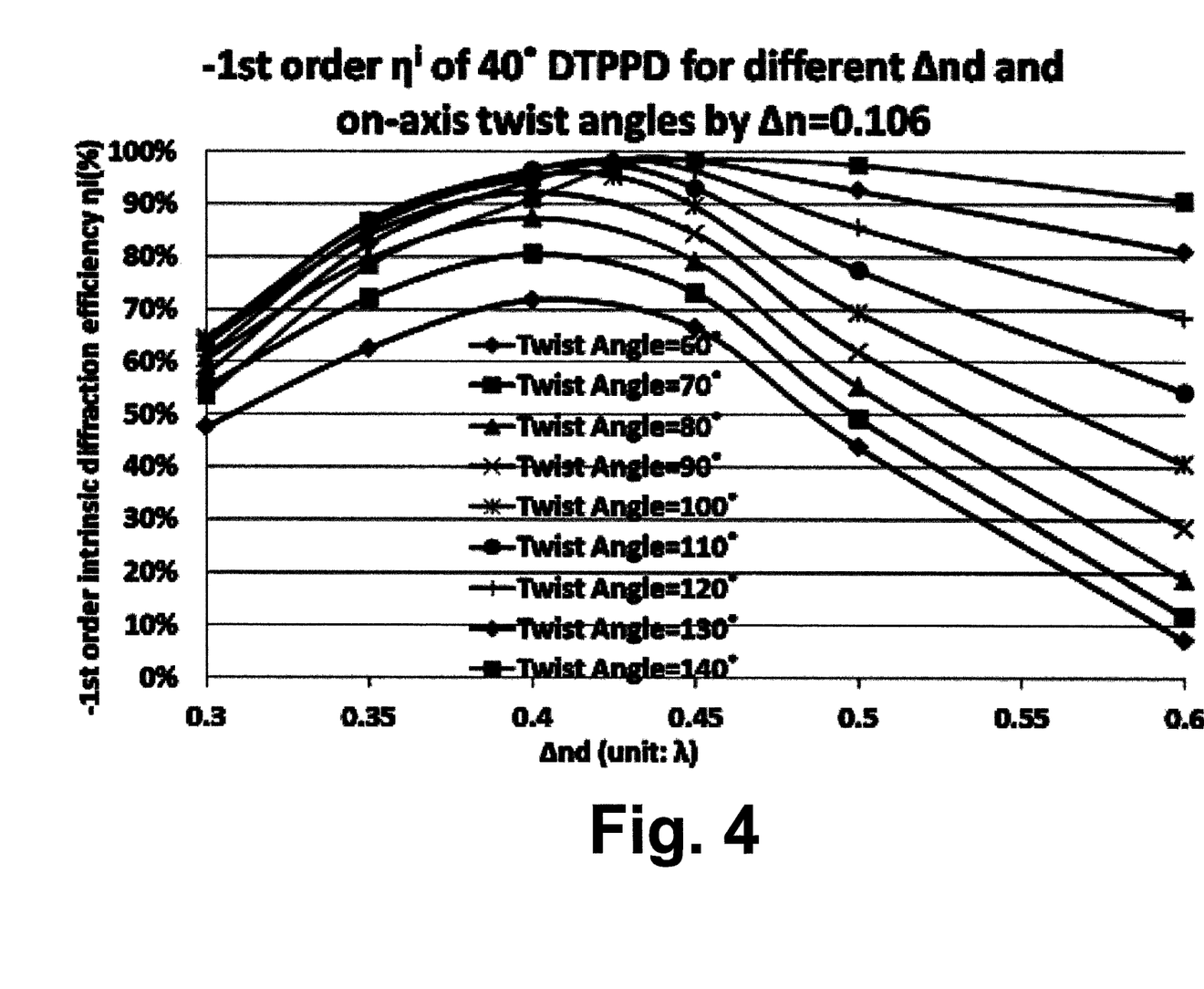
FIGS. 4-8 plot simulation results for finite-difference time-domain (FDTD) simulations of the model of FIG. 3 with different parameters.
Figure 5:
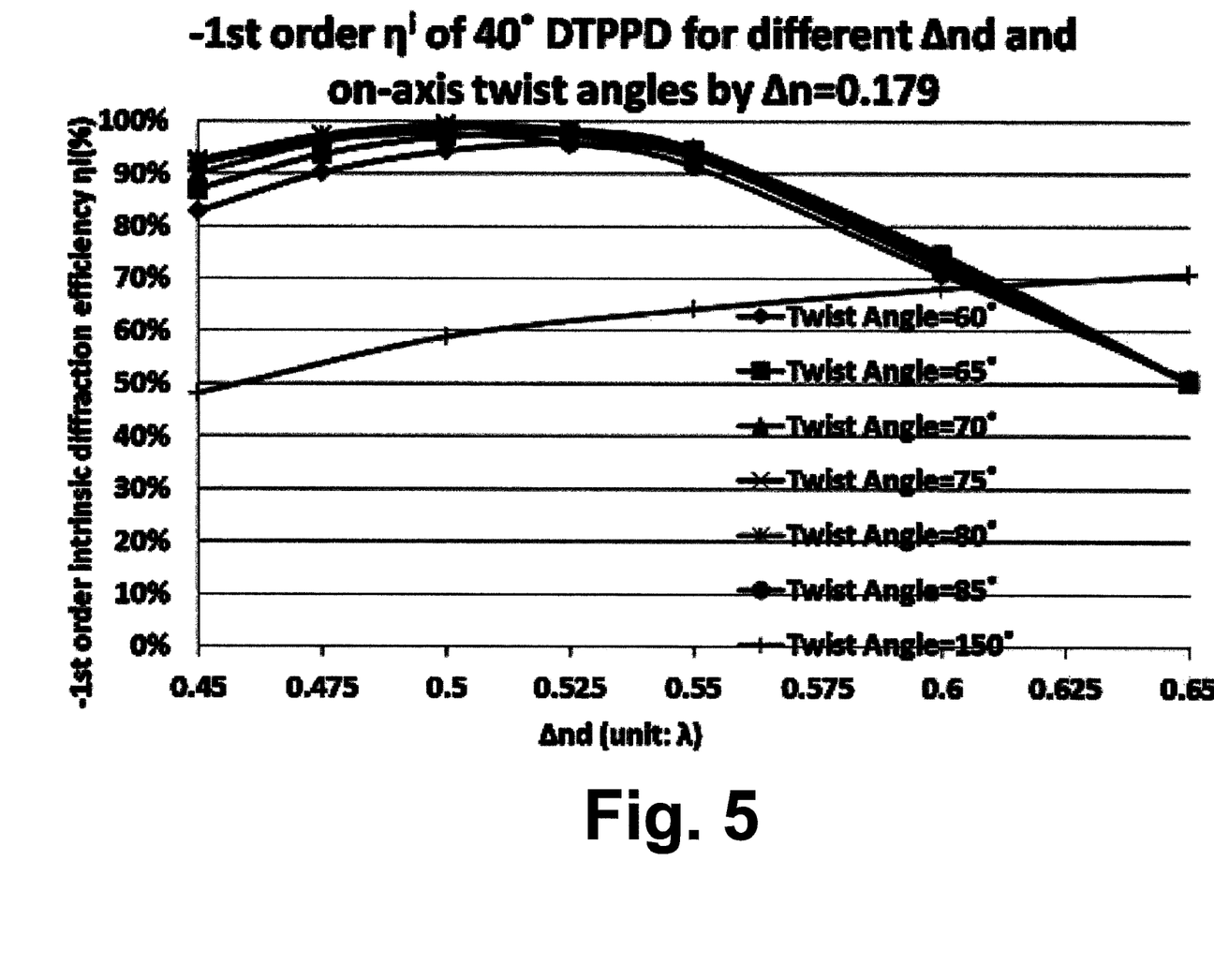
Figure 6:
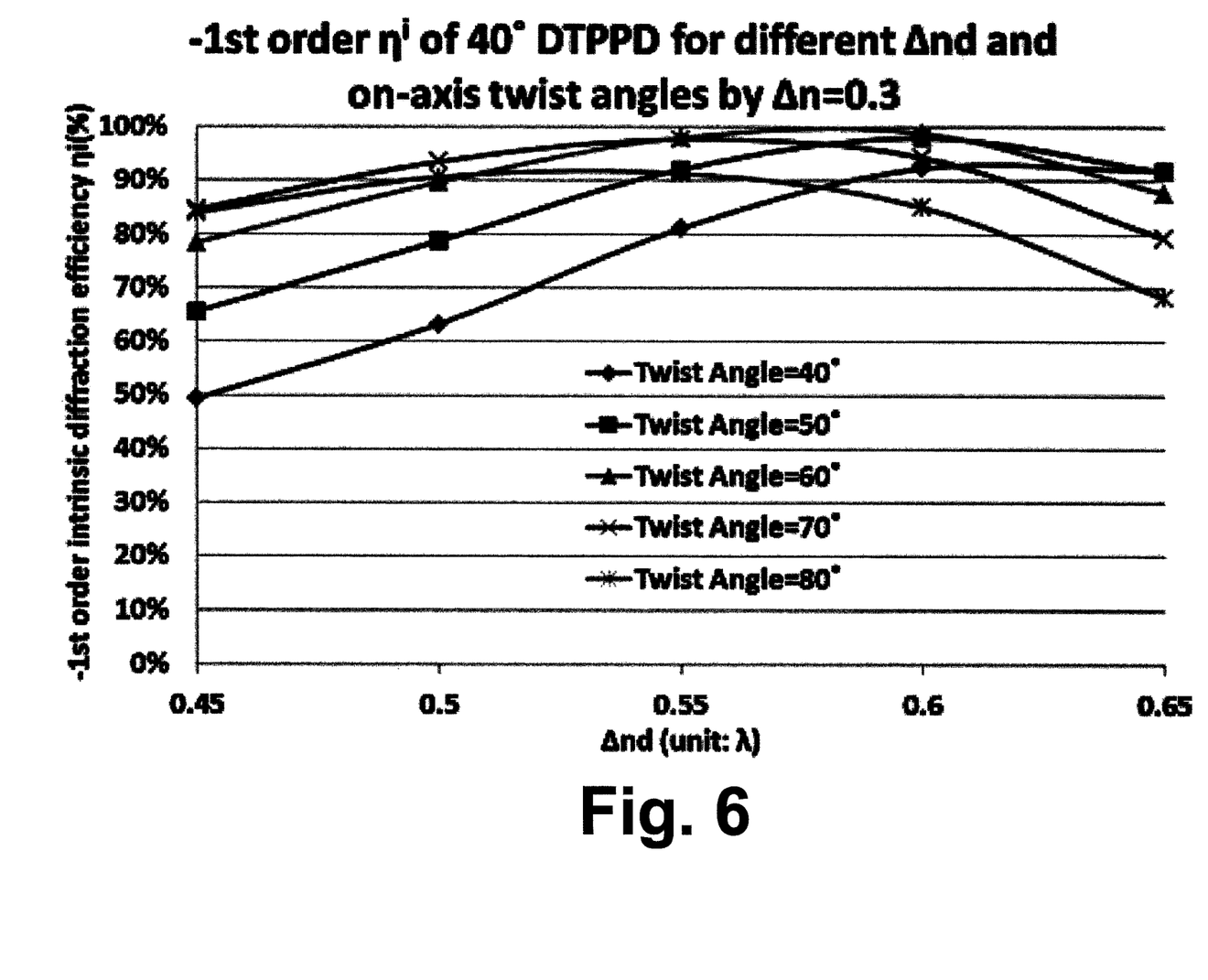
Figure 7:
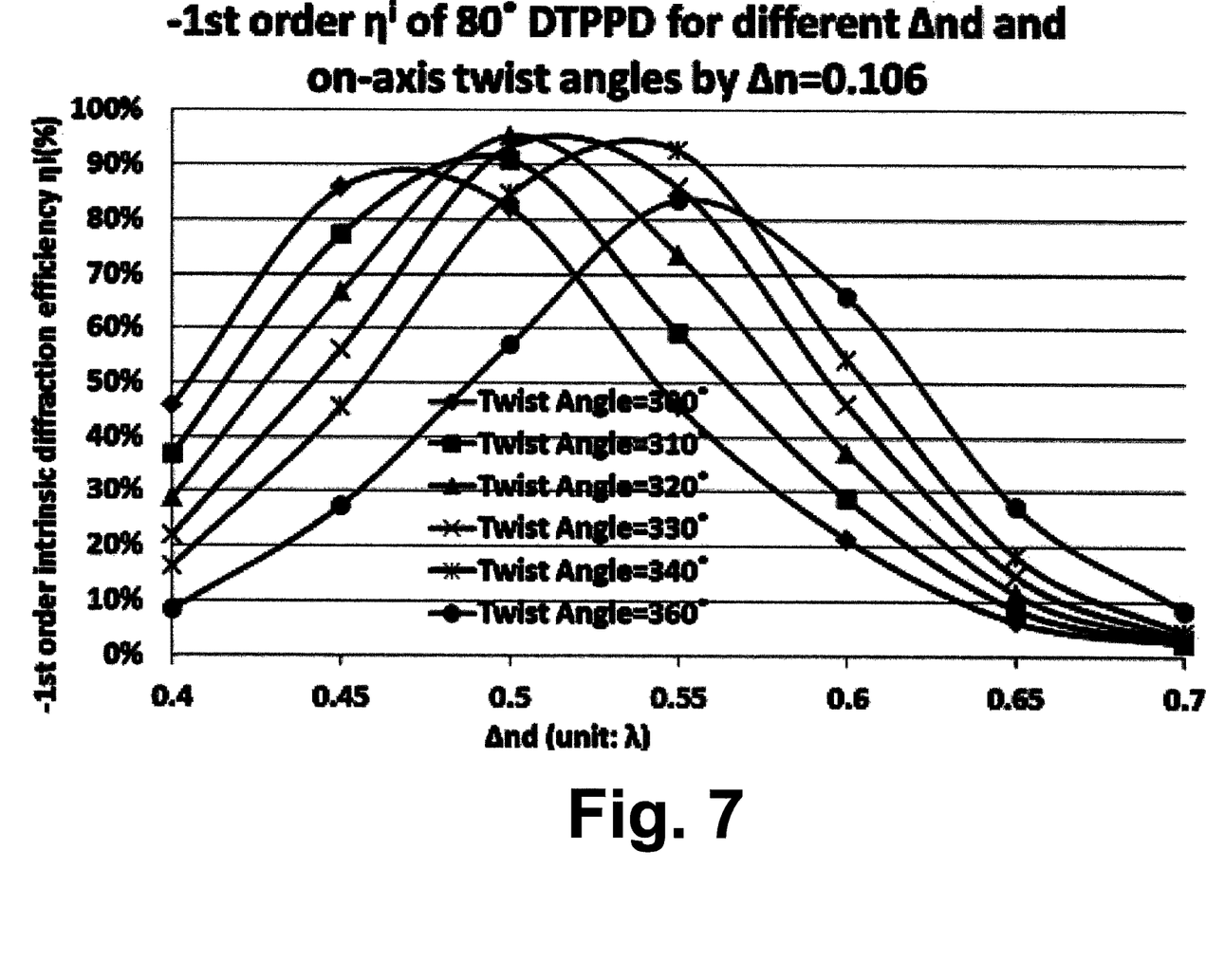
Figure 8:
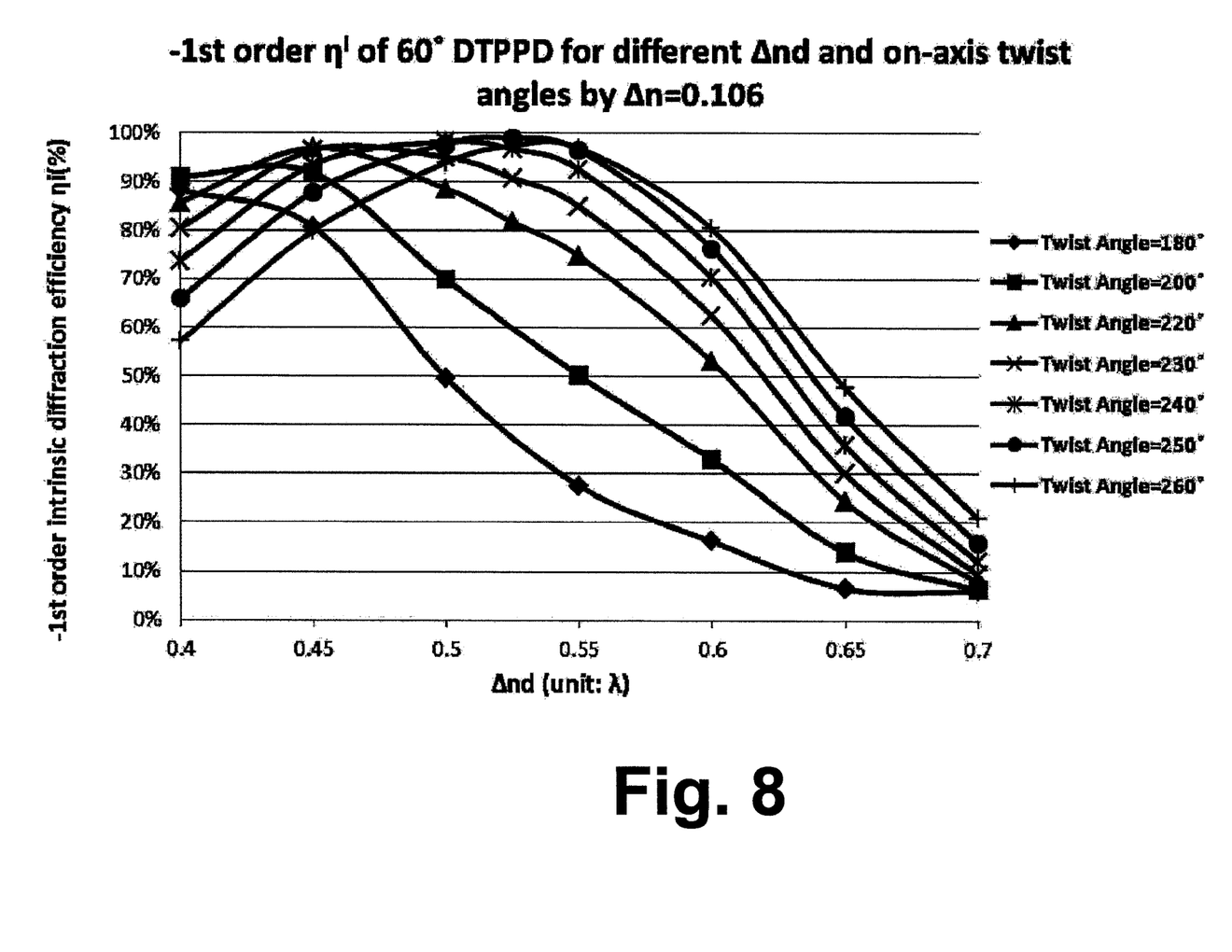

With reference to FIGS. 4-8 and Table 1, results for FDTD simulations using the model of FIG. 3 are presented, which are suitable for designing the DTPPD to provide first order deflection intrinsic efficiency $\eta^i$ of at least 0.90 for light of a free-space wavelength $\lambda_0$. In FIGS. 4-8, each graph title indicates the deflection angle (40° for the simulations of FIGS. 4-6; 80° for FIG. 7; and 60° for FIG. 8). FIGS. 4, 5, and 6 illustrate the impact of increasing birefringence (Δn=0.106, Δn=0.179, and Δn=0.3 for the simulations of FIGS. 4, 5, and 6 respectively). FIGS. 7 and 8 examine two different deflection angles 80° and 60° respectively, for Δn=0.106. In each of FIGS. 4-8, the abscissa (x-axis) is Δnd in units of the design-basis freespace wavelength $\lambda_0$ (denoted as λ in FIGS. 4-7) where d is the thickness of each of the two Pancharatnam layers 22, 24 (each being of the same thickness d). The ordinate (y-axis) is the intrinsic efficiency $\eta^i$. FDTD simulations were performed for various twist angle magnitudes $|\phi_{twist}|$ as indicated in the legends of FIGS. 4-8. The simulations of FIGS. 4-8 were for the design-basis freespace wavelength $\lambda_0$=0.633 micron. At this wavelength, the simulations with deflection angle of 40° (FIGS. 4-6) had in-plane half-pitch Λ=0.98 microns. For the simulations with deflection angle of 80° (FIG. 7) the in-plane twist had half-pitch Λ=0.64 microns. For the simulations with deflection angle of 60° (FIG. 8) the in-plane twist had half-pitch Λ=0.73 microns.

TABLE 1

Optimized transverse twist angle from FDTD simulations

| Beam deflection magnitude | Birefringence Δn | Optimal transverse twist angle $|\phi_{twist}|$ | Optimized $\eta^i$ |
|---|---|---|---|
| 40° | 0.106 | 120° | 98.44% |
| 40° | 0.179 | 75° | 99.29% |
| 40° | 0.3 | 60° | 98.90% |
| 60° | 0.106 | 250° | 98.93% |
| 60° | 0.179 | 160° | 99.22% |
| 60° | 0.3 | 85° | 99.31% |
| 80° | 0.106 | 320° | 95.27% |
| 80° | 0.179 | 180° | 94.55% |
| 80° | 0.3 | 130° | 95.82% |

As seen in FIGS. 4-8 and Table 1, the FDTD simulations indicated that intrinsic efficiency $\eta^i$~99% is achievable for all simulated designs except at the 80° deflection angle (FIG. 7) where intrinsic efficiency $\eta^i$~95% was the best obtainable efficiency. This lower efficiency (which is still well in excess of 90% is due to deflected light being overlapped with reflected light from the inside surfaces of the DTPPD. These results demonstrate that almost all of the input light is diffracted into the desired deflection angle (1st order diffraction angle).

As seen in Table 1, for DTPPDs with larger deflection angle, larger transverse twist angle $|\phi_{twist}|$ was needed to obtain high efficiency (e.g. $\eta^i$=90% or higher). A twist angle of at least 75° was optimal, except for the case of highest simulated Δn=0.3 and lowest deflection angle magnitude 40° where a lower twist angle of 60° was optimal. For larger beam deflection angles, the twist angle may be preferably at least 90° over the layer thickness.

The disclosed beam steering device 10 or variants as described herein or equivalents thereof may find application in any optical system that beneficially incorporates an electrically switchable, non-mechanical beam steering device. The disclosed optical magnification trains may for example be used in a camera, webcam, or other imaging system to provide a switchable camera viewing directions, or in an illumination system to provide switchable illumination beam steering.

It will be appreciated that various of the above-disclosed and other features and functions, or alternatives thereof, may be desirably combined into many other different systems or applications. It will be further appreciated that various presently unforeseen or unanticipated alternatives, modifications, variations or improvements therein may be subsequently made by those skilled in the art which are also intended to be encompassed by the following claims.

The invention claimed is:

1. An optical beam deflection device comprising:
a dual-twist Pancharatnam phase device (DTPPD) including a first Pancharatnam layer and a second Pancharatnam layer arranged parallel with the first Pancharatnam layer, wherein:
the DTPPD has an in-plane twist of pitch effective to deflect an input circularly polarized light beam through a first order deflection angle of magnitude at least 40 degrees,
the first Pancharatnam layer has a transverse twist of at least 60 degrees over the thickness of the first Pancharatnam layer along an optical axis of the DTPPD oriented transverse to the first and second Pancharatnam layers and
the second Pancharatnam layer has a transverse twist of at east 60 degrees over the thickness of the second Pancharatnam layer along the optical axis with twist sense opposite of the twist sense of the transverse twist of the first Pancharatnam layer.

2. The optical beam deflection device of claim 1 wherein the transverse twist of the second Pancharatnam layer over the thickness of the second Pancharatnam layer is equal in magnitude to the transverse twist of the first Pancharatnam layer over the thickness of the first Pancharatnam layer.

3. The optical beam deflection device of claim 1 wherein:
the first Pancharatnam layer has a transverse twist of at least 75 degrees over the thickness of the first Pancharatnam layer; and
the second Pancharatnam layer has a transverse twist of at least 75 degrees over the thickness of the second Pancharatnam layer.

4. The optical beam deflection device of claim 1 further comprising:
an electro-optic polarization element configured to convert an input light beam to the input circularly polarized light beam with left-handed circular polarization or right-handed circular polarization controlled by an electrical input.

5. The optical beam deflection device of claim 1 wherein the DTPPD further includes:
a substrate on which the first Pancharatnam layer is disposed with the second Pancharatnam layer disposed on the first Pancharatnam layer.

6. The optical beam deflection device of claim 1 wherein the first Pancharatnam layer and the second Pancharatnam are constructed as a single thin film.

7. The optical beam deflection device of claim 1 wherein the first Pancharatnam layer and the second Pancharatnam are constructed as two stacked thin films.

8. The optical beam deflection device of claim 1 wherein the first Pancharatnam layer and the second Pancharatnam are constructed as one polymerized film or as two stacked polymerized films.

9. The optical beam deflection device of claim 1 wherein the first Pancharatnam layer and the second Pancharatnam have a combined thickness of two microns or less.

10. The optical beam deflection device of claim 1 wherein the DTPPD has first order deflection intrinsic efficiency $\eta^i$ of at least 0.90 for light of a free-space wavelength $\lambda_0$.

11. The optical beam deflection device of claim 1 wherein for input circularly polarized light of a free-space wavelength $\lambda_0$:
for one of the first Pancharatnam layer and the second Pancharatnam layer, the in-plane twist and the transverse twist are effective for optical twist of the deflected light due to lateral beam deflection of the input circularly polarized light to be canceled by the optical twist caused by the transverse twist of the Pancharatnam layer along the layer thickness; and
for the other of the first Pancharatnam layer and the second Pancharatnam layer, the in-plane twist and the transverse twist are effective for optical twist of the deflected light due to lateral beam deflection of the input circularly polarized light to additively combine with the optical twist caused by the transverse twist of the Pancharatnam layer along the layer thickness.

12. An optical beam deflection device comprising:
a dual-twist Pancharatnam phase device (DTPPD) including first and second Pancharatnam layers each with an in-plane twist and a transverse twist that is at least 75 degrees over the thickness of each Pancharatnam layer with the twist sense of the second Pancharatnam layer being opposite the twist sense of the first Pancharatnam layer; and
an electro-optic polarization element arranged to input a circularly polarized light beam to the DTPPD with left-handed circular polarization or right-handed circular polarization controlled by an electrical input.

13. The optical beam deflection device of claim 12 wherein the in-plane twist of the DTPPD has a pitch effective to deflect the circularly polarized light beam input to the DTPPD through a deflection angle of magnitude at least 40 degrees.

14. The optical beam deflection device of claim 12 wherein the transverse twist of the second Pancharatnam layer over the thickness of the second Pancharatnam layer is equal in magnitude to the transverse twist of the first Pancharatnam layer over the thickness of the first Pancharatnam layer.

15. The optical beam deflection device of claim 12 wherein:
the first Pancharatnam layer has a transverse twist of at least 90 degrees over the thickness of the first Pancharatnam layer; and
the second Pancharatnam layer has a transverse twist of at least 90 degrees over the thickness of the second Pancharatnam layer.

16. The optical beam deflection device of claim 12 wherein the first Pancharatnam layer and the second Pancharatnam are constructed as a single thin polymer film.

17. The optical beam deflection device of claim 12 wherein the first Pancharatnam layer and the second Pancharatnam are constructed as two stacked thin polymer films.

18. The optical beam deflection device of claim 12 wherein the first Pancharatnam layer and the second Pancharatnam have a combined thickness of two microns or less.

19. The optical beam deflection device of claim 12 wherein the DTPPD has first order deflection intrinsic efficiency $\eta^i$ of at least 0.90 for circularly polarized light beam input to the DTPPD at a free-space wavelength $\lambda_0$.

20. An optical beam deflection method comprising:
generating circularly polarized light; and
deflecting the circularly polarized light by a deflection angle magnitude of at least 40 degrees using a dual-twist Pancharatnam phase device (DTPPD) with intrinsic efficiency $\eta^i$ of at least 0.90.

21. The optical beam deflection method of claim 20 further comprising reversing handedness of the circularly polarized light whereby the direction of the deflecting is reversed.

* * * * *